United States Patent
Pira

[11] 3,912,165
[45] Oct. 14, 1975

[54] METHOD AND APPARATUS FOR CONTROLLED DRIP IRRIGATION FROM CHAMBER MEANS LOCATED AT VARYING ELEVATIONS ALONG SOIL AREAS TO BE IRRIGATED

[76] Inventor: Edward S. Pira, 116 Rocky Hill Road, Hadley, Mass. 01035

[22] Filed: May 22, 1974

[21] Appl. No.: 472,448

[52] U.S. Cl. .................. 239/11; 137/10; 239/76; 239/450; 239/536; 239/542; 239/551; 47/48.5
[51] Int. Cl.² .................. A01G 25/00; B05B 15/00
[58] Field of Search .............. 239/1, 11, 70, 71, 74, 239/76, 86, 207, 266, 267, 271, 272, 450, 239/536, 542, 547, 550, 551, 556, 557, 239/559, 560, 562, 566, 567; 47/48.5; 61/12, 13; 222/188; 137/8, 10, 12, 14

[56] References Cited
UNITED STATES PATENTS

| 2,019,922 | 11/1935 | McLellan | 239/542 X |
|---|---|---|---|
| 2,622,610 | 12/1952 | Rowe et al. | 239/76 |
| 3,080,885 | 3/1963 | Webster et al. | 239/76 X |
| 3,518,831 | 7/1970 | Tibbals, Jr. et al. | 47/48.5 X |
| 3,586,239 | 6/1971 | Blass | 239/542 X |
| 3,736,955 | 6/1973 | Schlesser | 239/542 X |
| 3,817,454 | 6/1974 | Pira | 239/76 |

FOREIGN PATENTS OR APPLICATIONS

| 571,276 | 10/1958 | Belgium | 239/76 |
|---|---|---|---|
| 577,132 | 5/1946 | United Kingdom | 239/76 |

Primary Examiner—M. Henson Wood, Jr.
Assistant Examiner—Andres Kashnikow
Attorney, Agent, or Firm—Munroe H. Hamilton

[57] ABSTRACT

Fluid material of the class employed in subsurface and drip irrigation systems is furnished under pressure to a chamber body of extended length in which pressure variations may occur due to friction losses. The chamber body is located at varying elevations along soil areas to be irrigated. The fluid material, under relatively high pressure, is first conducted through a pressure-reduction stage communicating with the chamber body. Discharge of fluid material takes place at spaced apart dripper outlets connected into the chamber body. The total volume of the fluid discharged from the chamber and the degree of pressure drop are controlled in relation to one another to reduce and maintain the flow rate within a specific range of low velocity flow rates at which no appreciable friction losses take place with fluid being discharged substantially uniformly at all dripper outlets. Within the low velocity range of flow rates, certain classes of dripper outlets, i.e. dripper outlets of short orifice length, tend to become sensitive to certain other small pressure changes induced, for example, in chamber portions occurring at lower elevations than other chamber portions. There may occur loss of uniformity of discharge. Uniform release of material through all of these dripper outlets of short orifice length is realized by releasably confining a small column of the fluid in the path of flow of fluid exiting from the dripper outlets.

12 Claims, 14 Drawing Figures

METHOD AND APPARATUS FOR CONTROLLED DRIP IRRIGATION FROM CHAMBER MEANS LOCATED AT VARYING ELEVATIONS ALONG SOIL AREAS TO BE IRRIGATED

BACKGROUND OF THE INVENTION

This invention is directed to the field of irrigation and relates in particular to a method and apparatus for controlled drip irrigation from a chamber body of relatively long length located at varying elevations along soil areas to be irrigated.

In a co-pending application, Ser. No. 331,556 filed Feb. 12, 1973 entitled METHOD AND APPARATUS FOR SUBSURFACE AND DRIP IRRIGATION SYSTEMS, now U.S. Pat. No. 3,817,454, patented June 18, 1974, reference has been made to commonly existing difficulties encountered in the use of conventional irrigation systems and involving especially the problem of variation in fluid distribution which may occur at varying points in an irrigation line due to pressure changes, and particularly drop in pressure in an extended conduit length in which friction forces are of a significant nature.

In the co-pending application referred to, I have described and claimed a chamber method of irrigation in which the difficulties noted have been overcome by a method and means for furnishing fluid material to a chamber body in which a source of pressurized fluid material is provided and released from a fluid conducting chamber body of predetermined size. The high pressure fluid is conducted into the chamber body through a pressure-reducing stage and simultaneously a plurality of fluid discharges are released through discharge outlets located at separated points along the chamber body. The degree of pressure reduction is controlled in relation to the total volume of the fluid discharges to be released and simultaneously the flow rate of fluid moved through the chamber body is reduced to, and maintained, within a narrow range of relatively low velocity flow rate values wherein friction head losses are substantially avoided, with the result that very uniform fluid discharges are realized at all of the discharge outlets.

At some reduced flow rates in the range of relatively low velocity flow rates referred to, certain classes of dripper outlets which are economical and efficient to use, i.e. dripper outlets of very short orifice lengths, may become sensitive to small pressure changes. For example, small pressure changes may be induced and act on dripper outlets connected into some of the chamber portions located at lower elevations than other chamber portions. Thus these dripper outlets at lower elevations being under relatively greater pressure may tend to discharge fluid at higher velocities capable of interfering with discharge from dripper outlets connected into chamber portions at higher elevations. Specifically, increase in velocity of discharge from dripper outlets of short orifice length at lower elevations can create conditions arising from a "Venturi" effect. Here the velocity of the liquid may increase in moving through the orifice of short length and may be jetted out as a stream into the atmosphere. As a result, a pressure decrease or suction effect may be induced at higher elevations and no discharge of fluid will then occur through dripper outlets at these higher elevations.

It is a chief object of the invention, therefore, to improve methods of irrigation and to devise a method and apparatus for uniform discharge of fluid materials by drip irrigation utilizing an elongated chamber body with dripper outlets of short orifice length.

Another object is to devise a method of controlling flow of material from a dripper system in a manner such that pressure changes in an elongated chamber body occuring at both relatively high elevations and relatively low elevations may be regulated to maintain uniform distribution of the fluid.

Another object of the invention is to devise an improved dripper outlet construction for equalizing fluid release from dripper outlets of short orifice length and preventing the occurrence of suction failure.

SUMMARY OF THE INVENTION

With the foregoing objectives and problems in mind, I have conceived of a method and apparatus for furnishing fluid material throughout an irrigation system in a manner such that discharge of substantially uniform volumes of fluid may be realized at a multiplicity of discharge outlets located at varying distances from a pressurized fluid source and occurring at elevational differences of a significant nature.

My improved method has originated from a study of friction head loss data derived from measuring and evaluating varying flow rates and chamber sizes of conduit members in which pressurized fluid is allowed to flow. This data was prepared in the form of friction head loss charts and tables. Analysis of friction head loss data, thus obtained, has led to a determination of certain basic relationships which can be realized in a fluid flow system where a pressure drop occurs, and from this determination, there has been conceived a method and means of controlling the degree of pressure drop in relation to total volume of fluid being released from the system at a multiplicity of fluid outlets so as to reduce and maintain the flow rate of fluid supplied within a range of low velocity flow rates wherein friction losses are held to values such that pressure changes of any appreciable nature are avoided and as a consequence, uniform release of fluid can be realized at all of the fluid outlets.

In this connection, an important fact which has been determined is that friction head or pressure loss due to friction is low when the fluid flow rate is low in relation to pipe size. The term "chamber body," as hereinafter employed in the specification, is used to mean an oversized fluid enclosure or pipe which is generally of a size much larger than would be conventionally considered necessary to conduct a low volume of water. The term "chamber method" of subsurface and drip irrigation is also employed in the specification to denote a method of controlling flow of fluid in which head pressure is held substantially uniform throughout all portions of a fluid-containing chamber body, and uniform discharge rates from the chamber body regardless of location therealong are realized.

It will be appreciated that this uniform discharge rate is also governed by Bernoulli's flow equation. However, unlike conventional systems, in the chamber method, the drip or conduit outlet size may be held constant while the head or pressure may be changed to regulate the fluid discharge rates from the fluid outlets with uniformity still being achieved. It is also found that if different pressures are applied to individual chamber bodies, there may be realized compensation in changes in elevation and varying pressure requirements encountered in some working areas. Also, if the volume of flow is low in relation to the chamber body size, it is possible to conduct water over greater distances than is conventionally carried out.

In thus carrying out the method described, I have further determined that I may provide for a constantly maintained uniform discharge from dripper outlets of short orifice length when operating in a range of relatively low velocity flow rates. I have devised a method and apparatus for releasably confining a small column of fluid in the path of flow of fluid exiting from the discharge outlets of short orifice length. In one preferred embodiment, this may be accomplished by combining with the discharge outlets of short orifice length tubular extensions of a suitable shape and size.

The nature of the invention and its other objects and novel features will be more fully understood and appreciated from the following description of a preferred embodiment of the invention selected for purposes of illustration and shown in the accompanying drawings.

BRIEF DESCRIPTION OF THE DRAWINGS

FIG. 8 illustrates diagrammatically a short length drip unit arrangement with valve controls;

FIG. 9 is a detail elevational view of one of the valve controls indicated in FIG. 8;

DESCRIPTION OF PREFERRED EMBODIMENTS OF THE INVENTION

In accordance with the invention, therefore, I have devised a method and means for furnishing fluid material to an irrigation system in which a source of pressurized fluid material is provided and released from a fluid conducting chamber body of predetermined size. The high pressure fluid is conducted into the chamber body trough a pressure-reducing stage ans simultaneously a plurality of fluid streams are released through discharge outlets located at separated points along the chamber body. The degree of pressure reduction is controlled in relation to the total volume of the fluid stream required to be released and simultaneously the flow rate of fluid moving through the chamber body is reduced to, and maintained, within a narrow range of relatively low velocity flow rate values wherein friction head losses are substantially avoided with the result that very uniform discharge of fluid is realized at each of the discharge outlets. I find that by increasing the size of the chamber, the number of discharge outlets may be increased without loss of uniformity of flow.

Since my improved chamber method, in order to perform satisfactorily, requires that the chamber body be fully charged with fluid and a predetermined adjusted operating pressure be established, a considerable time difference may develop in filling an irrigation system of relatively short length as compared with a system of relatively long length.

With this in mind, I have further provided for carrrying out a rapid filling of chambers of relatively long length. This is accomplished by allowing fluid to flow directly into the chamber body from a high pressure water supply in order to charge the system before reverting to an adjusted operating pressure.

Figures 1, 5, 6:
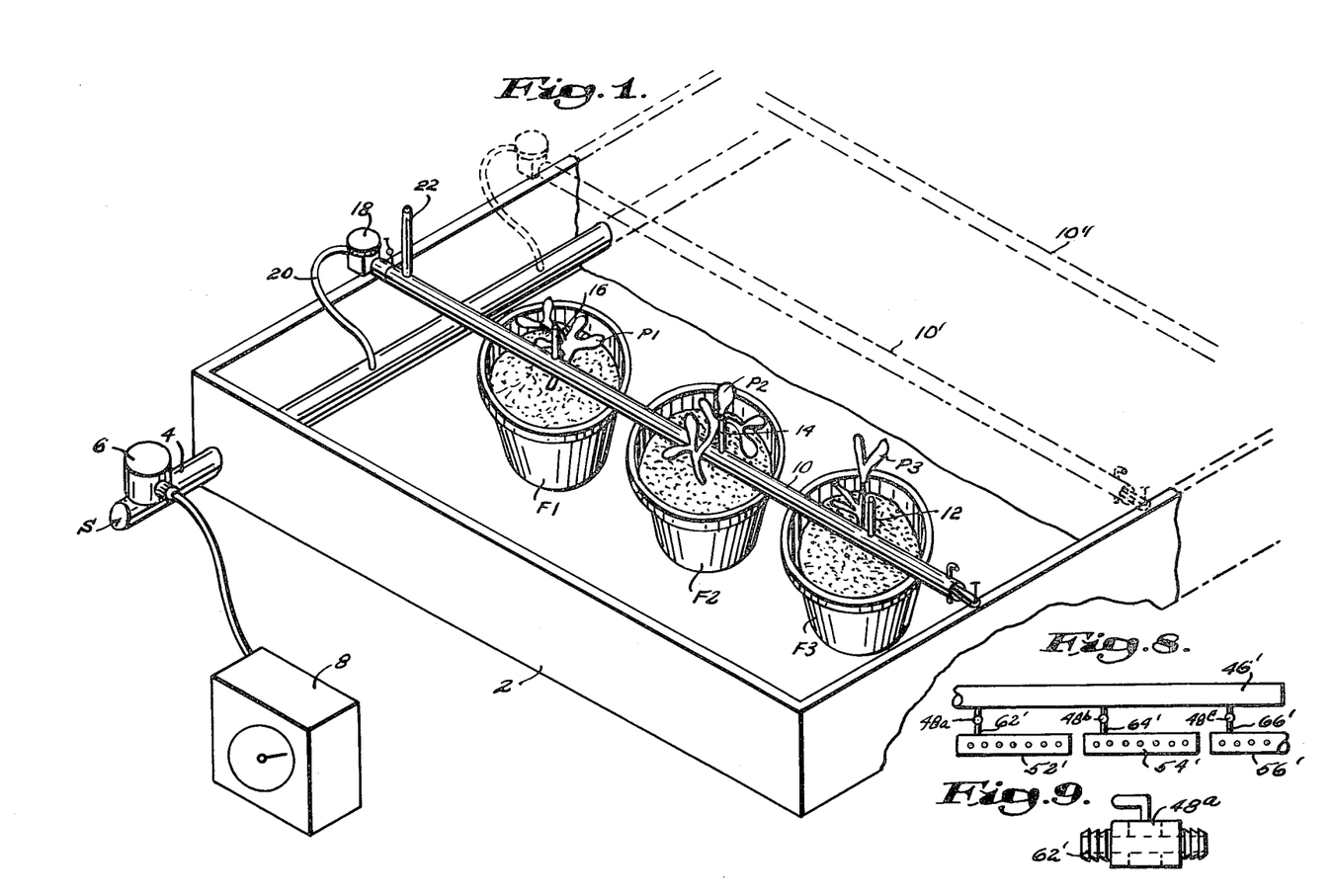
FIG. 1 is a perspective view illustrating one form of irrigation system in which the method and apparatus of the invention may be employed utilizing a relatively high pressure source of supply of fluid material.
FIG. 5 is a detail plan view of conduit and control valve means.
FIGS. 6 and 7 are diagrammatic views illustrating pressure reduction curve data and pressure control means.
Figure 2:
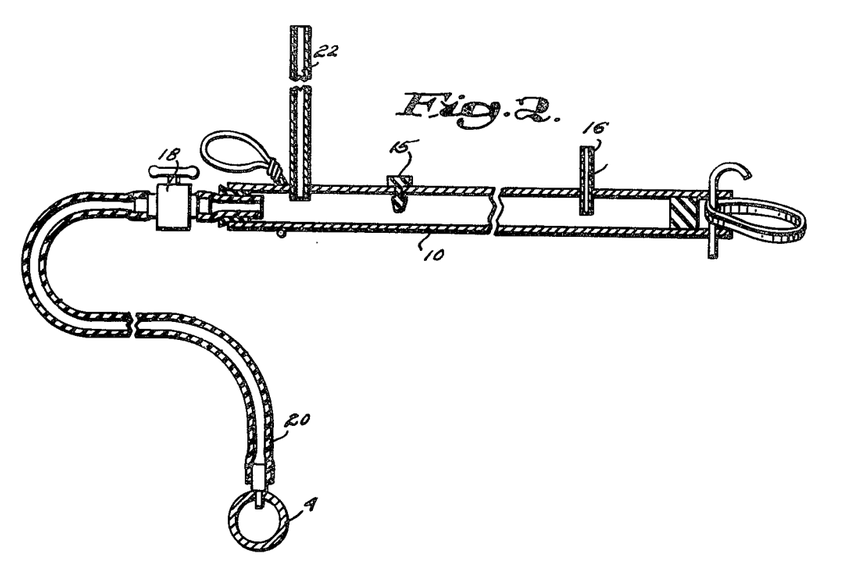
FIG. 2 is a detailed cross sectional view of portions of the apparatus shown in FIG. 1.

In the drawings, FIG. 1 illustrates diagrammatically a typical irrigation system of relatively short length such as may be employed in a greenhouse or similar operation and in which my chamber method may be carried out. FIG. 2 illustrates further detailed portions of fluid-control apparatus shown in FIG. 1.

Figure 3:
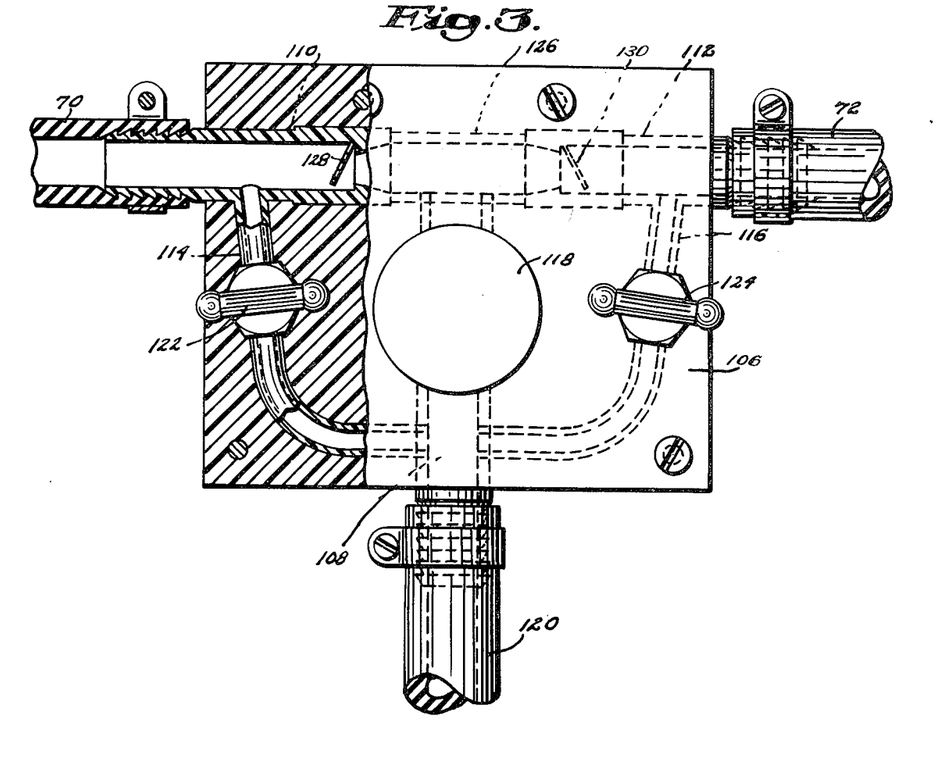
FIG. 3 is a fragmentary plan view of pressure reduction means of the invention.
Figures 4, 5:
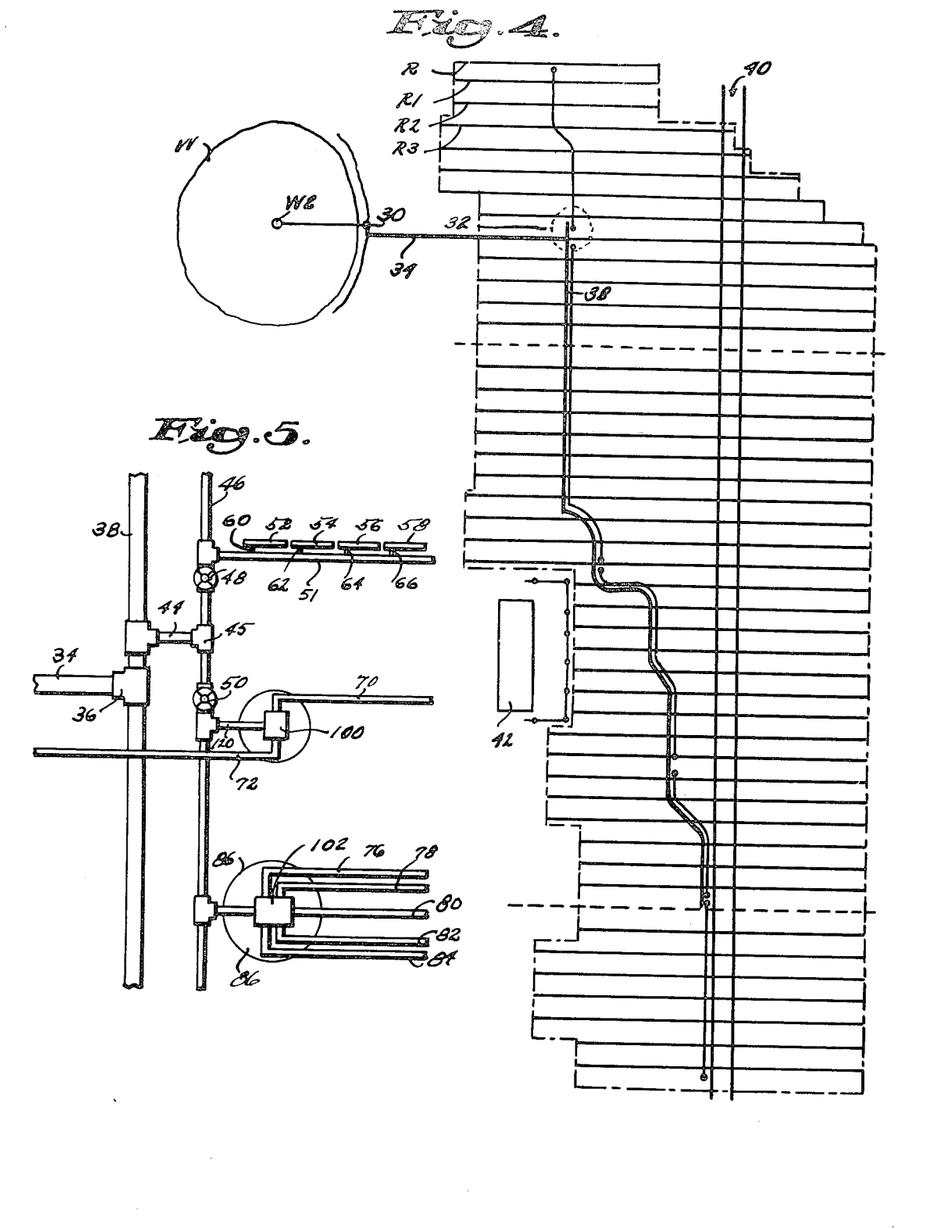
FIG. 4 is a diagrammatic view illustrating a typical irrigation system arranged to operate in accordance with the invention method.
Figure 6:
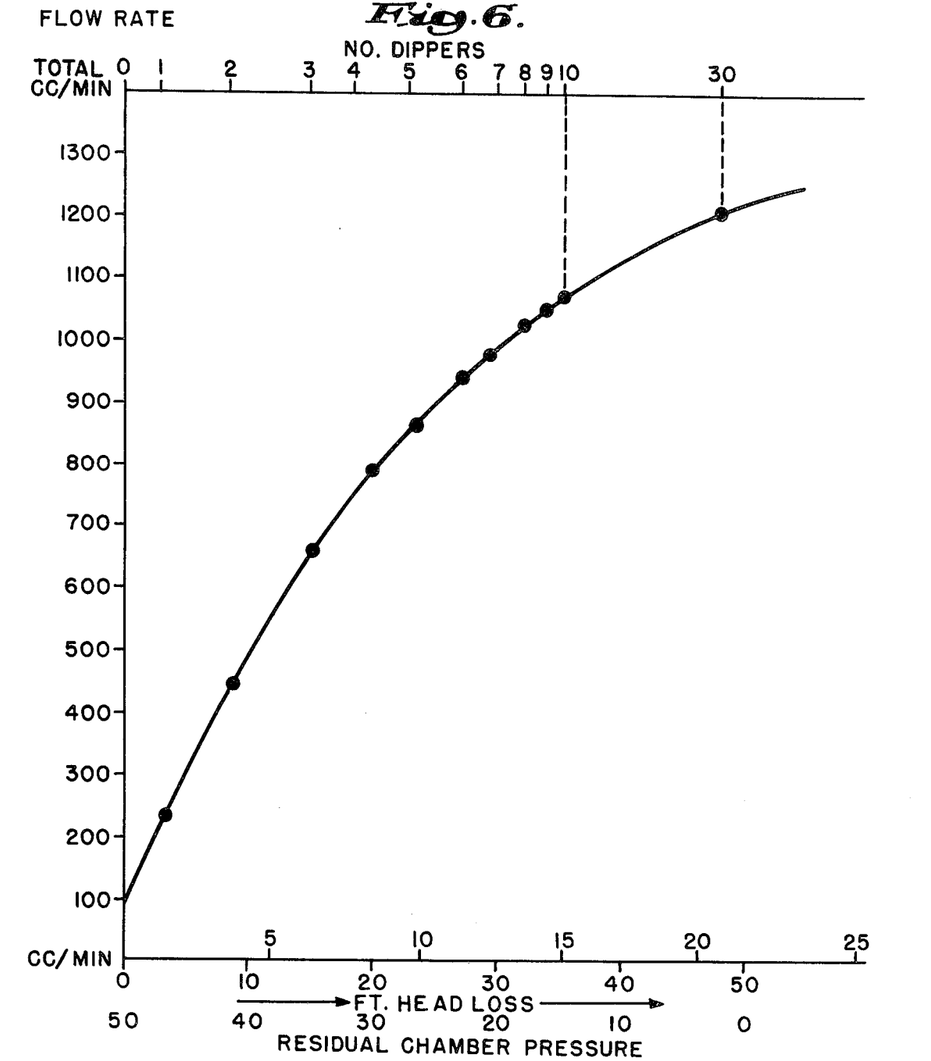
Figure 7:
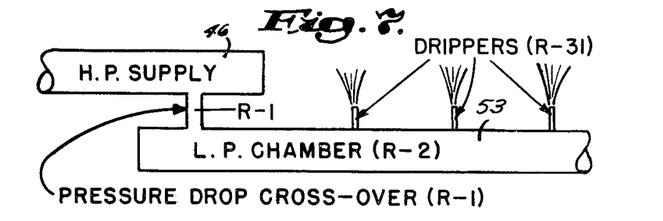

An irrigation system of relatively long length, together with fluid-control apparatus of the invention, is illustrated diagrammatically in FIG. 4, and, in more detail, in FIGS. 3, 5 and 7.

Considering in greater detail the structure shown in FIGS. 1 and 2, numeral 2 denotes a typical greenhouse bench arrangement in which plants P1, P2 and P3 are being grown in respective flower pots F1, F2 and F3. As is customary in watering plants on a greenhouse bench, a source of high pressure water S supplies a pressure of from 5.0 p.s.i. to 50.0 p.s.i., and this flow through the conduit 4 is controlled in some suitable manner as, for example, by means of a solenoid regulated valve 6 which may, in turn, be under the control of a time clock 8. Numerals 10, 10' and 10" denote feed pipes which are designed to be adjustably supported transversely across the bench member 2 in a position above the tops of the flower pots F1, F2 and F3. Located along the feed pipe 10, for example. I provide fluid discharge outlets or "drippers" as 12, 14, 16, etc.

In accordance with the invention, water from the conduit 4 is subjected to a pressure reduction stage by conducting the water through an adjustable pressure-reducing valve 18 which is connected to conduit 4 by a pipe 20. Numeral 22 denotes a pressure head tube for indicating variation in pressure. Water delivered from the pressure-reduced stage passes through the feed pipe 10 and provides for a flow simultaneously of small quantities of water from the drippers 12, 14 and 16. Utilizing the chamber method of the invention, the adjusted pressure is controlled with reference to the total number of drippers in operation, and this pressure, together with the total volume of fluid released through the drippers is regulated to maintain in the pipe 10 a low velocity flow rate at which friction head losses are substantially avoided.

As illustrative of a typical system for irrigating potted plants in a greenhouse, there may be cited a supply pressure in the conduit 4 of 20 p.s.i. This pressure was reduced by the adjustable valve 18 to a pressure of 0.11 p.s.i. in each of the feed pipes 10, 10' and 10''. Each feed pipe involved twelve 0.020 inch diameter drippers, as noted by numerals 15 and 16 in FIG. 2 (one for each pot in the row across the bench). The flow rate in each of the feed pipes was controlled and maintained at approximately 0.05 gallons per minute and approximately 0.004 g.p.m. per dripper.

This system was cycled to automatically turn on by a time clock controller, 8, in FIG. 1 and was allowed to operate 30 minutes every 24 hours. The duration of time the system operated was 8 weeks. During this period, the water flow from each dripper maintained a substantially uniform rate.

It should be understood that the number of drippers in the feed pipes can be increased or decreased in accordance to the width of the bench and the physical size of the pots used, peculiar to the greenhouse operation.

The watering cycle and length of watering time can be readily altered by the greenhouse operator's experience and good judgement. The irrigation requirements will vary with the species of plant, the stage of maturity, the volume and water holding capacity of the soil mixture used.

In a greenhouse installation of the character described where it was desired to increase the number of drippers being furnished from any one of the feed pipes 10, 10', 10'', it was found that by replacing these feed pipes with similar feed pipes of larger size, a continued uniform discharge could be realized with the same adjusted pressure setting. In this type of arrangement, little difficulty was experienced in filling the system without a time delay.

As further illustrative of a typical chamber method of sursurface and drip irrigation, I have illustrated diagrammatically in FIG. 4 an apple orchard consisting of roughly 7 acres of hilly land with 1350 2-year old apple trees being planted in this ground and being spaced about 10 feet apart along a row and the rows being spaced apart about 20 feet. In this particular irrigation system described, the supply of water was designed to feed through one dripper element 16, (FIG. 2), (0.032 inch X ¾ inch brass tube) per tree with provisions for expanding to three drippers as the trees grew larger. The water discharge rate required to be supplied for satisfactory irrigation purposes was specified at 0.03 gallons per minute or 1.8 gallons per hour per tree.

As indicated in FIG. 4, apparatus is shown arranged to furnish the required quantities of water in accordance with the chamber method of the invention. Included in FIG. 4 is a water supply consisting of a pond W from which water is drawn through a screen W2 by a pump 30 and delivered to a feed station generally indicated by the circled area 32.

FIG. 5 illustrates in larger scale the various components which arer localized at the feed station 32. As shown in FIG. 5, a conduit member 34, for example, a 2 inch mainline pipe receives high pressure water from the pump 30 and delivers it through a suitable tee 36 to a high pressure supply line 38. The supply line 38, carrying water under a pressure of from 30 p.s.i. near source to 5.0 p.s.i. at highest elevation in the field (i.e. 25' to 30'), is arranged to extend transversely across the rows of trees R, R1, R2, R3, etc. as shown in FIG. 4 in substantially parallel relationship to a roadway 40 located through the orchard. 42 indicates a barn arranged centrally of the orchard and the subsurface irrigation system described.

As further indicated in FIG. 5, water from the 2 inch main 38 is furnished through connections 44 and tee 45 to a 1 inch pipe 46 designed to carry water at a pressure of a desired magnitude. Supply and gate valves as 48 and 50 provide for selective control of flow along desired sections of line 46. It will be understood that water is drawn off from pipe 46 in varying amounts and at varying points in order to irrigate trees in different areas in the orchard with the trees occurring in different groupings and numbers. For example, the pipe 51 may be connected to pipe 46 and will supply water along its length at a pressure of 2½ p.s.i.

In accordance with the invention, a series of drip units as 52, 54, 56 and 58 are connected by adjustable pressure reducing connectors (FIG. 8) to a high pressure water supply pipeline 46'. For sections of the field having relatively steep grades or slopes, the high pressure feed pipeline is extended along the row.

The drip units were reduced in length to allow about 1% to 2% slope equivalency. That is, for rows having slopes of 4%, the drip units were limited from 25 to 50 feet. The drip units were constructed of ½ I.D. Polyethelene plastic pipes that were sealed at each end.

All of these dripper units, as shown, are designed with a number of water discharge outlets totaling 3 to 5 in number and the total volume of water from each outlet amounts to 1.8 gallons per hour. The outlets are comprised of 0.32 X ¾ inch brass tubes extending through the walled sections of the units. The pipe 51, together with its crossover pressure-reducing connectors and respective short lengths of dripper units 52, 54, 56, 58 thus constitute as irrigation system suitable for supplying the required amount of water earlier indicated to service 1350 2-year old trees. In this illustrative installation, the pressure of water supplied was 30 to 5 p.s.i. and the pressure of water after passing through the adjustable connector cross-overs into the dripper sections was reduced to a value of approximately 2½ p.s.i.

The pressure noted, adjusted in accordance with the chamber method of the invention and having regard for the total volume of water leaving the dripper sections, was found to provide a flow rate which resulted in substantially no friction head loss being present in the system and a uniform discharge rate was obtained at all of the outlets in the drippers.

As shown in FIG. 5, a similar arrangement was utilized to irrigate other relatively flat sections of the orchard involving longer feed pipes as suggested at 70 and 72 and extending in opposite directions from one another. These feed pipes are selectively controlled by the valve 50. Likewise, still other groups of feeder pipes may be connected as shown in FIG. 5 and as denoted by the pipes 76, 78, 80, 82 and 84, under control of a valve 86.

In all of these dripper sections, the chamber method was employed to carry out a pressure-reduction control in accordance with the total volume of water discharge while simultaneously a flow rate was maintained at a sufficiently low velocity to avoid any appreciably significant friction head loss at any point along the entire line.

As has been earlier noted, in a subsurface irrigation system of the size described above, the chamber method operation is dependent upon the entire system having been completely filled. To accomplish this at the low pressure and low flow velocity rates indicated would be impractical and to avoid this difficulty, I have provided in combination with the low pressure system described a rapid-fill means indicated in the drawings in FIG. 5 at 100 and 102 and shown more in detail in FIG. 3.

As suggested in the latter Figure, numeral 106 denotes a valve block which is formed with a fluid inlet port 108 and fluid outlet ports as 110 and 112 which are connected to inlet port 108 by respective passageways 14 and 116. A valve member 118 may, if desired, be solenoid controlled to open and close the inlet port 108 to regulate flow of fluid entering the block through the conduit 120. Connected to the outlet ports 110 and 112 are respective conduits 70 and 72. The passageways 114 and 116 are selectively adjusted to regulate the reduced operating pressure by valves as 122 and 124. Between the outlet ports 110 and 112 is a common passageway 126 having at opposite ends thereof flapper valves as 128 and 130.

In operation, when a rapid filling of the system is desired, valve 118 is opened. This allows high pressure fluid to pass through inlet 108 and then pass the flapper valves 128 and 130 out of the outlet ports 110 and 112 to rapidly fill at high pressure all sections of the chamber body comprised by all of the pipe sections and the supply pipes. As soon as the system is filled, valve 118 is closed and fluid then is passed through the smaller passageways 114 and 116 and leave the pipes 70 and 72 at a desired reduced pressure which has been pre-regulated in accordance with the dripper and flow rate requirements already disclosed. Valves 122 and 124 remain open at all times.

The volume of liquid discharged from a given diameter and type of outlet or dripper is a function of its resistance to flow and the residual pressure in the chamber.

FIG. 6 depicts a typical curve showing the relationships of total volume of discharge (cc per min.), pressure drop through cross-over conduit means, residual pressure in the chamber as the number of drippers added to the chamber increases from 1 to 30. This curve was plotted from test data using the cross-over method shown diagrammatically in FIG. 7.

As an example, a non-adjustable cross-over tube R-1 (0.064 inch × 1.0 brass tube) was inserted between a high pressure liquid supply 46 (21.65 p.s.i. or 50' water gauge) and a low pressure distribution chamber 53.

With no elevation differences and no drippers, the pressure will equalize through the system and the supply pressure will equal chamber pressure. As drippers are added to the chamber, the toal resistance ($R_3$) is lowered, increasing the flow rate. The pressure drop through the cross-over ($R_1$) increases. The residual pressure in the chamber decreases.

The decrease of residual pressure and the discharge rate per dripper will decrease rapidly as the first few drippers are added but will diminish and tend to level off as more drippers are added and as the cross-over ($R_1$) begins to limit flow rate.

Since the residual pressure and dripper discharge rate are interdependent, the increase of total flow is relatively small which causes the energy loss through the cross-over ($R_1$) to increase slightly. With the addition of each dripper, the effect upon chamber pressure becomes less, as illustrated by the typical curve in FIG. 6. The approximate discharge rate per dripper can be obtained by dividing the total flow by the number of drippers found for a given point along the curve.

Further, tests showed that the slope of the curve varied with: (1) change of supply pressure, (2) the type and size of cross-over, (3) the type, size and length of chamber, (4) the type, size and spacing of outlets, and (5) elevation differences. Due to these variables the use of a non-adjustable cross-over tube would not be practical for drip and subsurface irrigation systems.

In my improved method, the adjustable cross-overs or conduits, as illustrated in FIGS. 8 and 9, offer a considerable advantage over the previously described tube type. As shown in FIGS. 8 and 9, high pressure pipe 46' is provided with cross-over pipes as 62', 64', 66' connecting with short lengths of drip units 52', 54', 56', and each cross-over pipe is fitted with valve elements 48a, 48b, 48c, better shown in FIG. 9. After the field installation has been completed and the chambers charged with water, the adjustable cross-over provides a rapid means of regulating the rate of water discharged from each individual chamber in the system. The rates can be varied at will to meet the existing field conditions.

*Subsurface Irrigation Systems.* The chamber method disclosed applies to subsurface installations as well as surface systems, but there are some additional considerations.

It is conceivable that the external dripper clogging problem in subsurface systems occurs when the water drains from the chamber after the system is shut off. A vacuum could be created which could "suck" the soil particles into the dripper orifices causing them to become plugged. With the chamber method, a very low positive pressure can be maintained in the chamber at all times between irrigation periods. The dripper discharge rate at this reduced pressure would be negligible. Also, during the initial quick-fill period, a surge of high pressure water can be applied to the chamber which could flush the drippers.

In FIGS. 10 to 13, I have disclosed a desirable modification of the invention involving the use of dripper outlets of very short orifice length. It has been found that dripper outlets of this class are economical and efficient to utilize in some installations and as illustrative of outlets of this type, there may be cited metal and plastic spray heads having a relatively short orifice length of, for example, 0.064 — 0.125 inches. Dripper outlets with orifices of this size may be produced in various ways, as for example, by drilling or burning holes through conduit wall portions of the dripper outlet body.

With such small orifice length outlets, a relatively small pressure can cause a "Venturi effect" resulting from velocity of fluid discharged increasing at the throat of the outlet construction so that a jet or stream may be emitted rather than a regulated flow of drops of fluid. It has been found that a small pressure change, of the nature described, can occur from change in elevation of the chamber body into which the dripper outlets are connected. Thus, as operating pressure is lowered from about 1.5 p.s.i. down to about 0.072 p.s.i., and particularly in the lower range of from about 0.5 p.s.i. down to about 0.072 p.s.i., jetting increases and dripper outlets at higher elevations may fail to emit fluid uniformly, and in some cases, no fluid may be discharged at all. This occurrence takes place for the reason that the total accumulated pressure decrease from one or more fluid dripper outlets at a lower elevation is sufficient to overcome the base pressure of the fluid outlets located at higher elevations and atmospheric air may be drawn or sucked into the system.

I have discovered that I may control this difficulty and provide for uniform dripper discharge at retarded flow rates from dripper outlets of very short orifice length at both higher and lower elevations in a low range of operating pressure of from about 1.5 p.s.i. down to about 0.072 p.s.i. In accomplishing this, I retard jet flow discharge by releasably confining small columns of fluid in the path of flow of discharged material exiting from the outer sides of the short length orifices. This I find may be effectively carried out by attaching a segment of flow regulating conduit, preferably of a flexible nature, to the outer side of the short length orifice. The flow regulating conduit is chosen of a length such that it supports a column of fluid in a position to act as a baffle or dam to jet flow of fluid. The flow regulating conduit may be of varying shapes in order to support portions of the column of fluid at least at the level of the short length orifice and preferably well above the level of the orifice. By means of this arrangement, fluid is constantly filling the attached conduit segment and fluid is continuously released in a discharge droplet form. A typical length of attached flow regulating conduit may be in a range of from one to five inches or longer and the outer extremity of the conduit is preferably located at a level slightly below the level of the dripper outlet orifice.

Figure 10:
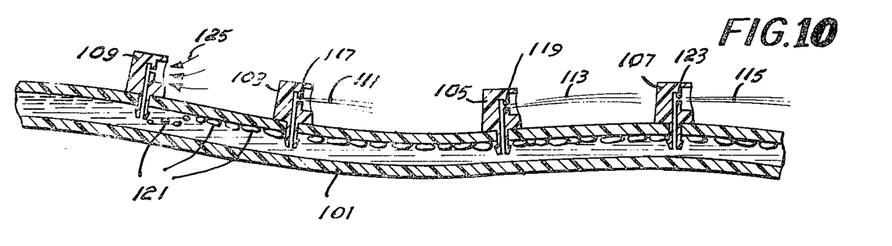
FIG. 10 is a fragmentary cross sectional view further illustrating a chamber body whose discharge outlets of short orifice length are disposed at varying elevations in which high velocity jetting may be experienced.

In FIG. 10, there is illustrated a chamber body 101 which is supported at varying elevations so that dripper outlets 103, 105, 107 occur at a lower elevation than the dripper outlet 109. As indicated diagrammatically in FIG. 10, fluid discharge, because of greater pressure, tends to occur in the form of relatively high velocity jets as 111, 113, 115; also shown on a somewhat larger scale in FIG. 12, as they leave the short length orifices 117, 119, 123.

It will be understood that all of these outlets shown in FIG. 10 are of a type which can be quickly inserted in the conduit body and are of proven operating characteristics and are economical and efficient to use because of ease of drilling or burning the short length orifice therethrough.

In the event that there occurs discharge in the form of high velocity jets 111, 113, 115 exiting from the outlets, there may be induced a "Venturi effect" at, for example, the outlet 109 which is at a higher elevation and is therefore subject to a lower pressure which may fall below atmospheric pressure. In such case air may be sucked in as has been indicated diagrammatically by the arrow 125 and air bubbles 121 collect along the inner wall surface of the chamber body 101.

Figure 11:
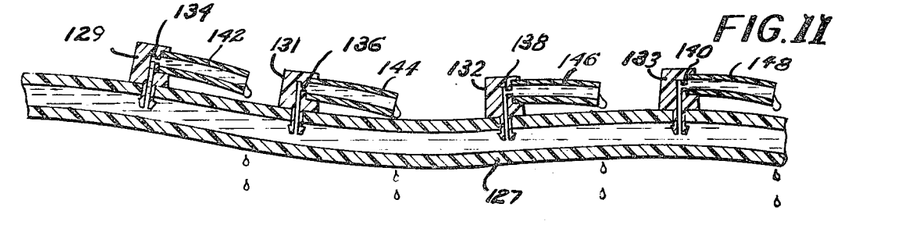
FIG. 11 is another fragmentary cross sectional view of a chamber body disposed at varying elevations and having fluid outlets of short orifice length combined with means for releasably confining a small column of fluid in the path of flow of exiting material.
Figure 12:
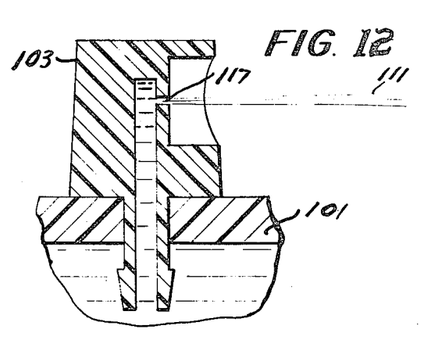
FIG. 12 is another fragmentary detail cross sectional view indicating a jetting action of fluid occurring under low pressure conditions.
Figure 13:
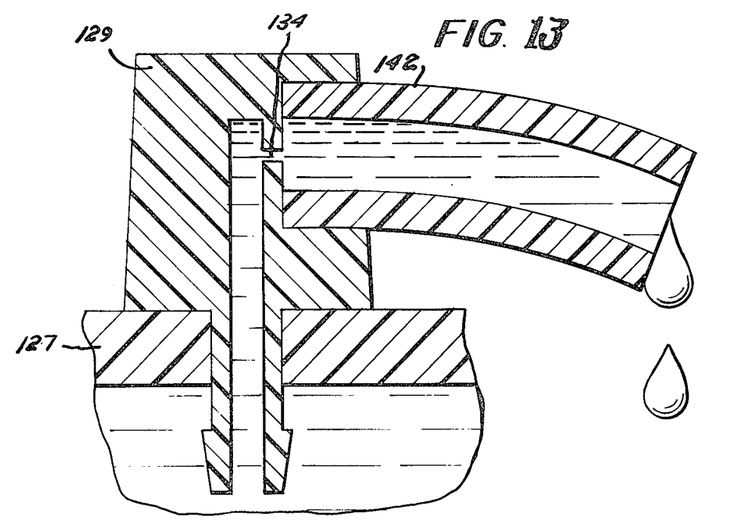
FIG. 13 is a fragmentary cross sectional view on an enlarged scale of one of the dripper units of FIG. 9 combined with the flow regulating means of the invention.
Figure 14:
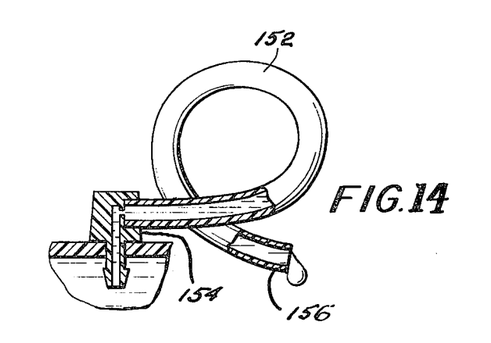
FIg. 14 is a detail view of another desirable form of tubular extension.

In accordance with the invention, I provide air flow regulating conduits or tubes as shown in FIGS. 11, 13 and 14. As noted therein, a chamber body 127 is connected into the dripper outlets 129, 131, 132, 133 which are formed with short length orifices 134, 136, 138, 140. Attached to these outlets at the outer side of the short length orifices are the flow regulating conduits 142, 144, 146 and 148. In the preferred form of flow regulating conduits, they are of a curved or slightly bent shape. Outer extremities of these conduits are located at a level slightly below the level of the fluid outlet orifices as shown in FIG. 11 and FIG. 13, and this provides for controlling any tendency for jetting to occur within the pressure range of about 0.5 p.s.i. down to about 0.072 p.s.i. As a result, a pressure equalization is realized which provides for constant uniform drip discharge regardless of the elevation at which the chamber body may be located. However, as the operating pressure is increased above the 0.072 p.s.i. to 0.5 p.s.i. range, a force may be exerted of a magnitude sufficient to partially overcome the baffle effect of the flow regulating conduits shown in FIGS. 11 and 13. The fluid is then jetted for a short distance beyond the dripper orifice before the velocity is reduced to fill the conduit segment and released in the form of drops. This limited jetting under some conditions may cause enough "Venturi effect" to slow the fluid discharge rate from some drippers located at the higher elevations.

To overcome this difficulty, it is necessary to provide a greater column resistance for eliminating the "Venturi effect," in the above-noted operating range of from about 0.5 p.s.i. to about 1.5 p.s.i. This I find may be accomplished by locating portions of the flow regulating conduit in a position well above the level of the short length orifices, and FIG. 14 illustrates one desirable arrangement of this type. As shown in FIG. 14, a flow regulating conduit element 152 is formed with a curled shape and a substantial portion of the curl and the column of fluid contained therein is arranged in a position well above the level of the short length orifice 154 while the extremity 156 of the conduit is arranged to extend downwardly below the level of orifice 154. With this configuration of flow regulating conduit, back pressure created by the raised portion of the column of water along with the pull of gravity was found to be adequate in eliminating any significant "Venturi effect" and a satisfactory drip rate was realized at all points along the chamber with a range of pressures suitable for this drip rate. It will be understood that other configurations for supporting portions of a column of fluid above the short length orifice may be employed.

It will be seen from the foregoing disclosure that I have devised an improved and efficient method and apparatus for drip irrigation which is, in general, based on the premise that the head loss in a conduit due to friction is low and the water flow rate is low in relation to the pipe size as set forth in Darcy's head loss equation. With the head in a chamber of the types specified above, being relatively uniform along the length of the chamber, then relatively uniform flow from the fluid outlets may be carried out and the liquid discharge rate from the dripper outlets can be raised or lowered selectively by changing the pressure in the chamber in accordance with Bernoulli's flow equation. The method and apparatus described is well adapted to use with varying conditions and can be utilized with any suitable water source available which will provide water free from solid particles.

It is possible for the operator of the apparatus to vary the dripper flow rates and adjust for changing water needs of plantings during a growing season. For example, beginning pressure may range from about 0.10 p.s.i. to 1.5 p.s.i., which is generally adequate for most field, greenhouse and subsurface irrigation systems.

It is again pointed out that an external dripper clogging problem may be encountered in subsurface systems when the water drains from the chamber after the system is shut off. Here a vacuum may be created capable of sucking soil particles into the dripper orifices causing them to become clogged. With the chamber method of the invention, a very low positive pressure can be maintained in the chamber at all times between irrigation periods. The dripper discharge rate at this reduced pressure would be negligible. Also during the initial quick-fill period in starting up a new irrigation period, a surge of high pressure water can be applied to the chambers which is operative to flush the dripper outlets.

Advantages deriving from the invention and its low operating pressure values include minimizing the danger of flooding and soil erosion in case of breaks in distribution chambers, and dripper outlets can be added, removed and replaced while the system is in operation. Because of the resulting versatility, the method and its apparatus is readily adaptable to closely spaced plants as row crops and potted plants, widely spaced plantings as berries and fruit trees, and irregularly spaced plantings as domestic shrubbery or other hillside vegetation.

I claim:

1. In a method of drip irrigation in which an elongated chamber body is located along soil areas to be irrigated characterized by relatively higher elevations and relatively lower elevations whereby the velocity of fluid discharge from portions at lower elevations may be under a pressure which exceeds the pressure of discharge from chamber portions at higher elevations, the steps which include providing a source of fluid material at a predetermined relatively high pressure, conducting the high pressure fluid into a chamber body of a length extending away from the source for a substantial distance through which friction losses incurred along the chamber body are operative to cause a variation to said pressure, reducing the pressure of the fluid as it passes through the chamber body, simultaneously releasing predetermined volumes of fluid through separated discharge outlets communicating with the chamber body, and releasably confining small columns of the fluid in the path of flow of the exiting volumes from their respective discharge outlets to provide a retarded rate of discharge which is substantially uniform for outlets at all elevations.

2. A method according to claim 1 in which the retarded rate of discharge occurs in the form of drops of the fluid.

3. A method according to claim 1 in which the pressure is reduced within a pressure range of from about 1.5 p.s.i. to about 0.072 p.s.i.

4. A method according to claim 1 in which the degree of pressure reduction and the total volume of all of the separated discharge volumes are controlled in relation to one another to reduce and maintain the rate of flow of fluid throughout the chamber body at a value at which no friction head losses are induced at any point along the said length of the chamber body.

5. That improved method of furnishing fluid material to an irrigation system which comprises providing a source of fluid material at a relatively high pressure, conducting the high pressure fluid through a pressure reducing stage into a chamber body of a length extending away from the said source for a substantial distance through which friction losses occurred along the chamber body are operative to cause a variation to said pressure, reducing the pressure of the fluid as it passes through the pressure reducing stage into the chamber body to a pressure lying within a range of pressures of from about 1.5 p.s.i. to about 0.072 p.s.i., discharging predetermined volumes of fluid through separated dripper outlets of short orifice length communicating with the chamber body, releasably confining small columns of fluid in the path of flow of the exiting volumes, and maintaining rate of flow of fluid throughout the chamber body at a retarded value at which no appreciable friction head losses are induced along the said length of the chamber body and discharge of fluid from each of the dripper outlets is substantially uniform at all elevations of the chamber body.

6. A method according to claim 5 in which the small columns of fluid are supported for movement along arcuate paths.

7. A method according to claim 6 in which the outer extremities of the columns are located at a level below the level of the dripper outlets.

8. Apparatus for supplying fluid material to an irrigation system comprising means for furnishing a high pressure fluid, a chamber body located along soil areas to be irrigated which are characterized by relatively high elevations and relativley low elevations, conduit means for conducting selected quantities of said fluid material into the chamber body, a plurality of dripper outlets of short orifice length communicating with the chamber body, valve means for controlling the pressure of fluid passing into the chamber body in accordance with the volume of fluid leaving the chamber body through the dripper outlets, said means for furnishing the high pressure fluid including pump means and a pressure reducing valve connected to the pump means for reducing the said high pressure fluid to a pressure lying within a range of pressures which are sensitive to change in elevation of the chamber body, and whose lower limits are from about 1.5 p.s.i. to about 0.072 p.s.i., and flow regulating conduits attached at the outer sides of the dripper outlets of short orifice length in a position to retard rate of flow of fluid from the dripper outlets.

9. Apparatus according to claim 8 in which the said flow regulating conduits are of a curved shape and extending downwardly to a level below the level of respective dripper outlet orifices.

10. A method according to claim 1 in which portions of the said small columns of fluid are supported at a level substantially above the level of the said dripper outlets.

11. A method according to claim 1 in which portions of the said small columns of fluid are supported in flow regulating conduits of a curled shape whose curled portions occur at a level substantially above the level of the said dripper outlets and whose outer extremities are located below the level of the said dripper outlets.

12. Apparatus for supplying fluid material to an irrigation system comprising means for furnishing a high pressure fluid, a chamber body located along soil areas to be irrigated which are characterized by relatively high elevations and relatively low elevations, conduit means for conducting selected quantities of said fluid material into the chamber body, a plurality of dripper outlets of short orifice length communicating with the chamber body, valve means for controlling the pressure of fluid passing into the chamber body in accordance with the volume of fluid leaving the chamber body through the dripper outlets, said means for furnishing the high pressure fluid including pump means and a pressure reducing valve connected to the pump means for reducing the said high pressure fluid to a pressure lying within a range of pressures which are sensitive to change in elevation of the chamber body, and whose lower limits are from about 1.5 p.s.i. to about 0.072 p.s.i. and flow regulating conduits attached at the outer sides of the dripper outlets of short orifice length in a position to retard rate of flow of fluid from the dripper outlets within a range of the pressures noted, and said flow regulating conduits being formed with a curled shape, portions of which curled shapes are located above the level of the dripper outlets.

* * * * *